United States Patent
Naugler et al.

(10) Patent No.: US 7,234,224 B1
(45) Date of Patent: Jun. 26, 2007

(54) CURVED GROOVING OF POLISHING PADS

(75) Inventors: Steven Naugler, Hockessin, DE (US);
Steven J. Pufka, Pennsville, NJ (US);
Jeffrey R. Stack, Clayton, DE (US);
Weitung Wang, Newark, DE (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 0 days.

(21) Appl. No.: 11/592,910

(22) Filed: Nov. 3, 2006

(51) Int. Cl.
*B23C 3/00* (2006.01)
*B23P 15/00* (2006.01)

(52) U.S. Cl. .................. 29/557; 409/143; 409/132; 451/56

(58) Field of Classification Search ........ 409/131–132, 409/143; 451/56, 527, 63, 548, 526, 533, 451/539, 528, 529; 29/557–558
See application file for complete search history.

(56) References Cited

U.S. PATENT DOCUMENTS

| | | | |
|---|---|---|---|
| 3,705,339 A * | 12/1972 | Rhoades et al. | 409/80 |
| 5,569,062 A * | 10/1996 | Karlsrud | 451/285 |
| 5,878,476 A * | 3/1999 | Noelle et al. | 409/131 |
| 5,919,012 A * | 7/1999 | Nakagawa et al. | 409/132 |
| 6,340,325 B1 | 1/2002 | Chen et al. | |
| 6,641,471 B1 | 11/2003 | Pinheiro et al. | |
| 6,685,548 B2 * | 2/2004 | Chen et al. | 451/526 |
| 6,783,436 B1 * | 8/2004 | Muldowney | 451/41 |
| 6,843,711 B1 * | 1/2005 | Muldowney | 451/527 |
| 6,852,020 B2 * | 2/2005 | Petroski et al. | 451/526 |
| 6,869,343 B2 | 3/2005 | Suzuki | |
| 7,017,246 B2 * | 3/2006 | Suzuki | 29/50 |
| 7,140,088 B2 * | 11/2006 | Suzuki | 29/557 |
| 2006/0160478 A1 * | 7/2006 | Donohue et al. | 451/285 |
| 2007/0034614 A1 * | 2/2007 | McClain et al. | 219/121.69 |

OTHER PUBLICATIONS

Zelinski, Peter, "Micro Milling At ½ Milliion RPM", MMS Online; Aug. 2003, Gardner Publications Inc.
Niser, Van, "The Router Way"; May 2005, vol. 57, No. 5; Cutting Tool Engineering Magazine.

* cited by examiner

*Primary Examiner*—Erica Cadugan
(74) *Attorney, Agent, or Firm*—Blake T. Biederman

(57) ABSTRACT

A method is provided for forming grooves in a polishing pad useful for planarizing a substrate in a chemical mechanical planarization process. The method maintains average velocity as a function of bit diameter to enable groove formation using a rotating bit, whereby grooves can be formed at a higher rate while maintaining high groove quality and low defectivity.

10 Claims, 4 Drawing Sheets

CURVED GROOVING OF POLISHING PADS

BACKGROUND OF THE INVENTION

The present invention relates generally to the field of polishing pads for chemical mechanical polishing. In particular, the present invention relates to a method for forming grooves in the surface of a polishing pad.

Integrated circuit manufacturing consists of a series of layering steps in which conductive, semiconductive or dielectric materials are deposited onto, or removed from, the surface of a substrate such as a silicon wafer. These layers are deposited by techniques such as sputtering, chemical vapor deposition or electrochemical plating. These layers may also be etched to create channels or holes into which subsequent layers may be deposited.

The deposition process, especially when used to fill channels or holes, results in a non-planar surface. Before subsequent layers of an electronic device can be deposited, the surface of the wafer must be planarized. Chemical mechanical polishing or planarization (CMP) is frequently used to prepare the surface of the wafer for further processing by removing excess material deposited in the layering process or exposing underlying material. The CMP process both removes large scale topography, such as artifacts left by channels or holes after they have been filled by a deposition process, and eliminates small scale imperfections, such as scratches.

In a typical CMP process a semiconductor substrate is mounted on a rotating carrier assembly and contacted with a polishing pad in a CMP apparatus. The carrier assembly provides controlled force, pressing the substrate against the polishing pad and optionally provides lateral motion in addition to rotation. The polishing pad is mounted on a rotating platen; and a polishing composition is supplied to the surface of the polishing pad such that the polishing composition flows over the surface of the polishing pad and enters the gap between the polishing pad and the substrate. The polishing composition contains appropriate chemistry for polishing the substrate and optionally contains abrasive particles to aid in the removal of substrate material. The mechanical action of the polishing surface and the abrasive particles against the substrate surface acts in conjunction with chemical interaction between the substrate and the polishing composition to planarize the surface of the substrate, which is then prepared to receive another layer by a deposition process or can otherwise be altered, as through etching.

In order to facilitate the transportation and delivery of the polishing composition to the surface of the substrate, and thereby facilitate the CMP process, it is often desirable to create asperities in the polishing surface of the polishing pad. Asperities may be created by embedding particles in the polishing pad during manufacture, such as soluble particles or hollow capsules. The soluble particles dissolve when exposed to the polishing composition, leaving behind an asperity. The embedded capsules may be ruptured, thereby exposing the hollow core to the polishing surface, creating an asperity. In either case, polishing composition fills the asperity and is transported by the motion of the polishing pad, relative to the substrate, and delivered to the surface of the substrate. Asperities also serve to collect used polishing composition, polishing composition that has reacted with the surface of the substrate and debris, caused by the mechanical action, from the gap between the polishing surface and the substrate. As the CMP process continues, the polishing surface is worn away, exposing new particles or capsules to the polishing surface, thereby regenerating the asperities.

Another method for creating and regenerating asperities on the surface of the polishing pad is through conditioning. Typically, conditioning involves abrading or cutting the polishing surface with a plurality of diamond points or other mechanical means. The diamond points are typically embedded in a conditioning pad that is pressed against the polishing surface while the polishing pad rotates, and is optionally rotated, oscillated or otherwise moved relative to the polishing pad. The diamond points create small holes or channels that fill with and transport the polishing composition and remove debris material. The channels created by conditioning may also serve to aid in the flow of the polishing composition over the surface of the polishing pad as discussed below.

An important consideration in the design of a CMP process is the rate of flow of the polishing composition over the polishing surface. In order to control the flow of the polishing composition, grooves may be added to the polishing surface. Various factors such as groove dimensions, shape and orientation affect the rate of flow of the polishing composition both into and out of the gap between the substrate and the polishing surface, and the overall rate of consumption of the polishing composition. Optional groove configurations include circular, spiral, x-y, and radial. Grooves are typically created by cutting the polishing surface on a lathe after the polishing pad has been formed. Alternatively, grooves may be pressed or stamped into the polishing pad, or may be created in a molding process.

Parallel groove designs such as circular, spiral and x-y grooves may be formed by a cutting device with a plurality of fixed blades. For example, a large number of circular grooves may be cut simultaneously using a lathe with a plurality of fixed blades. Optionally a lathe can be used to form grooves in a polishing pad with a rotating bit. One of the advantages of a lathe is that the polishing pad can be rotated very quickly under a stationary blade, which allows grooves to be formed at a high rate even if only a single blade is used.

In order to form some groove configurations (typically diverging groove patterns), such as straight or curved-radial grooves, a CNC machine is used. In CNC milling machines, a rotating bit moves in the X, Y and Z directions relative to the polishing pad. The rotating bit is typically rotated at low speeds, and may optionally be tilted or moved laterally. A CNC machine can be used to create intricate patterns not achievable on a lathe, but has the disadvantage of being able to produce only one groove at a time. The use of a CNC machine therefore results in a manufacturing process that is time consuming and inefficient.

One method for forming grooves in a polishing pad is disclosed in U.S. Pat. No. 6,340,325 to Chen et al. The method involves the use of a router with a rotating bit opposing a platen on which is mounted a polishing pad. The router and the platen move with respect to one another in three axes. The router is lowered so that the bit cuts an initial hole to a desired depth not greater than the thickness of the pad, and is then moved laterally to create the desired groove pattern. According to this method, the groove pattern is formed by one continuous groove, and the groove depth may vary, but never exceed a maximum amount determined by the distance of protrusion of the router bit beyond integral stops.

Research in the area of the effect of groove configuration on a CMP process shows that certain groove configurations have beneficial effects on the CMP process, such as improving wafer uniformity, eliminating small scale topography from the polished surface of a substrate, or reducing the rate of consumption of the polishing composition. These groove configurations have become more important to the satisfactory performance of a CMP process in the future as integrated circuit manufacturing tolerances decrease and a greater degree of planarity on a smaller scale is required at less operating cost. Many of these beneficial groove configurations are not able to be made on a lathe, and require use of a CNC machine, which, as discussed above, is less efficient.

What is needed is a method of forming groove patterns in a CMP polishing pad with a lathe or a CNC machine using a rotating bit, which is more efficient and allows for a greater rate of production of grooved CMP polishing pads at an acceptable level of quality.

STATEMENT OF THE INVENTION

An aspect of the invention includes a method for forming grooves in a polymeric polishing pad useful for the chemical mechanical planarization of a substrate, the substrate being at least one of magnetic, optical and semiconductor substrates comprising: rotating a cutting bit about an axis in the z-direction, the cutting bit rotating at a rate of at least 60,000 revolutions per minute, the rate being sufficient to melt the polymeric polishing pad upon low velocity contact with the polishing pad without cooling and having at least one cutting edge for cutting groove depth in the z-direction into the polymeric polishing pad; cutting the polishing pad in an x-direction and a y-direction to form at least one curved groove in the polymeric polishing pad, the x-direction and y-direction being perpendicular in a single plane and orthogonal to the z-direction by contacting the rotating cutting bit with a portion of the polymeric polishing pad, the at least one curved groove having polymeric sidewalls; ejecting cut debris from the polishing pad within the at least one groove with at least one flute in the rotating cutting bit; and varying velocity of at least one of the x-direction or y-direction with a program-generated signal to guide cutting through a curved path and to provide the at least one groove with a curved configuration in the polymeric polishing pad, the program-generated signal sending the rotating cutting on a curved path while maintaining the speed of the rotating bit to maintain calculated chip thickness at a factor of 0.02 to 0.6 diameter of the rotating cutting bit and to reduce melting of the polymeric sidewalls of the polymeric polishing pad.

DETAILED DESCRIPTION

The present invention provides a method for forming curved grooves on the surface of a CMP polishing pad that improves groove quality and increases the level of throughput for a given tool. In particular, the present invention provides a method to increase the efficiency of a grooving tool by controlling the feed rate while avoiding melting of groove sidewalls without compromising the grooves' curved path. The invention achieves this by determining chip thickness as a function of drill bit diameter and maintaining velocity of the drill bit through curved groove section to avoid melting from traveling too slow, segmented grooves by slowing or stopping for changes in direction and serrated edges traveling too fast.

Exemplary polishing pads for CMP planarization may be made of a thermoplastic material, such as, a thermoplastic polyurethane, polyvinyl chloride, ethylene vinyl acetate, polyolefin, polyester, polybutadiene, ethylene-propylene terpolymer, polycarbonate and polyethylene teraphthalate, and mixtures thereof. In addition, the polishing pad may be made of a thermoset material, such as, a cross-linked polyurethane, epoxy, polyester, polyimide, polyolefin, polybutadiene and mixtures thereof. The process of the invention is particularly useful for cutting porous and non-porous polishing pads. Preferably, the polishing pad is made from a cross-linked polyurethane such as IC 1000™ and VisionPad™ polishing pads manufactured by Rohm and Haas Electronic Materials CMP Technologies.

Figure 1:
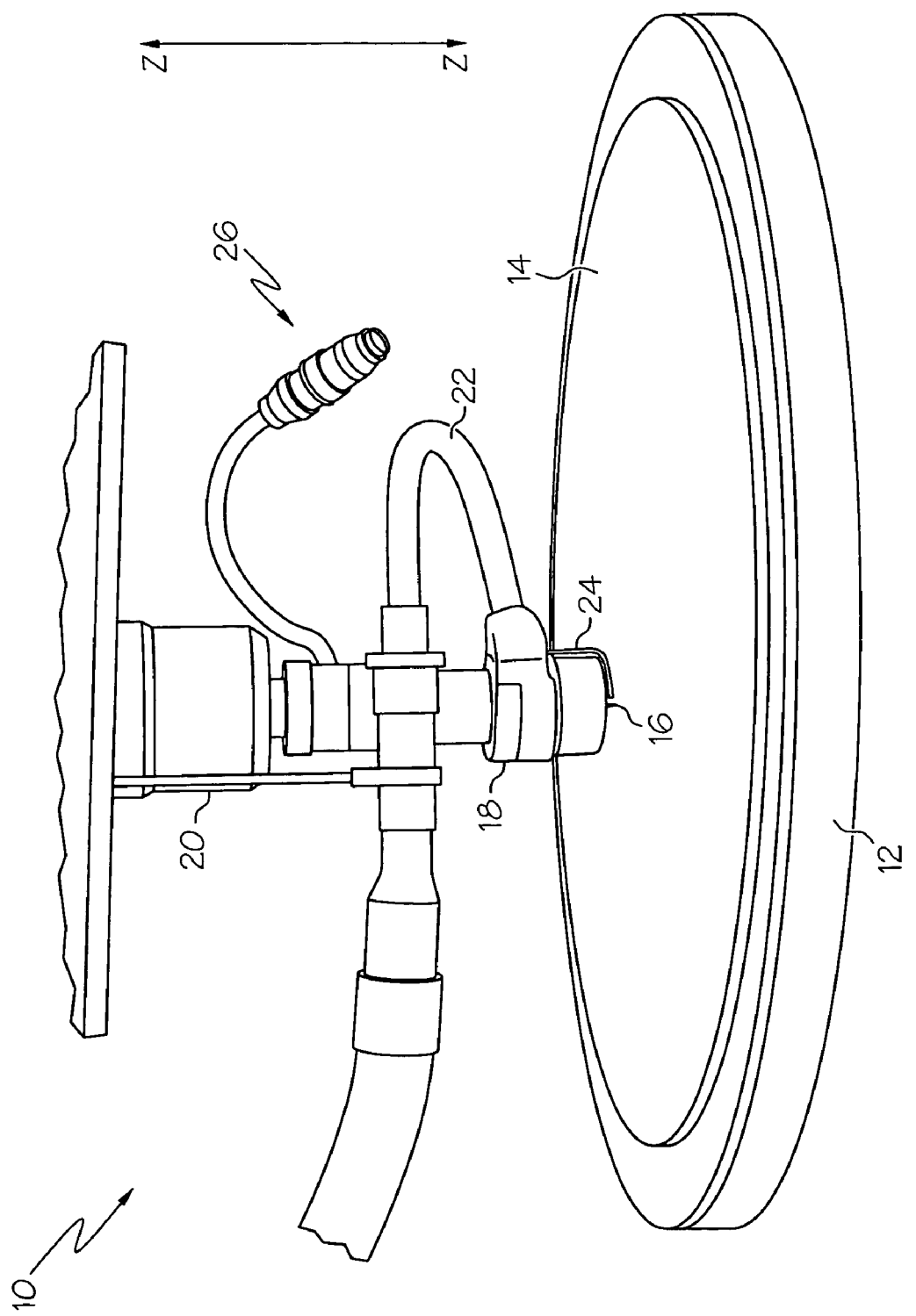
FIG. 1 is a schematic representation of a grooving tool useful for creating curved grooves in polishing pads.

Referring to FIG. 1, grooving tool 10 includes a rotating table 12, on which a polishing pad 14 is mounted. The polishing pad 14 may be mounted with conventional means, such as adhesives, hook and loop fasteners or by the application of vacuum pressure to the back of the pad 14. Preferably, a vacuum secures the polishing pad 14 to mounting table 12, such as a vacuum fixture. The table 12 is optionally moveable, by means such as rollers, casters, slides etc., in at least two axes, x and y, and may be rotated clockwise or counterclockwise. The table 12's, movement is controlled by a computer system and driven by motors, gears, hydraulics, pneumatics etc. The grooving tool 10 additionally comprises a cutting bit 16, fixedly attached to a rotatable spindle 18, which is carried and positioned by a moveable mounting assembly 20. The moveable mounting assembly 20 is moveable in at least the z direction; and the moveable mounting assembly 20's movement is preferably controlled by a computer and driven by motors. Moving the bit up and down the z-axis illustrated by line z—z controls the grooves' depth. The table 12 and mounting assembly combine for movement in x, y and z directions. For example, it is possible for the table to move in the X and Y directions, and the spindle to move in the Z direction or for the spindle to move in the X and Z directions with the table moving in the Y direction. During cutting, optional vacuum line 22 removes debris and gas line 24 cools the rotating bit and the polishing pad 14. Flexible connectors 26, illustrated with end broken away, power the rotating spindle 18.

Figure 2:
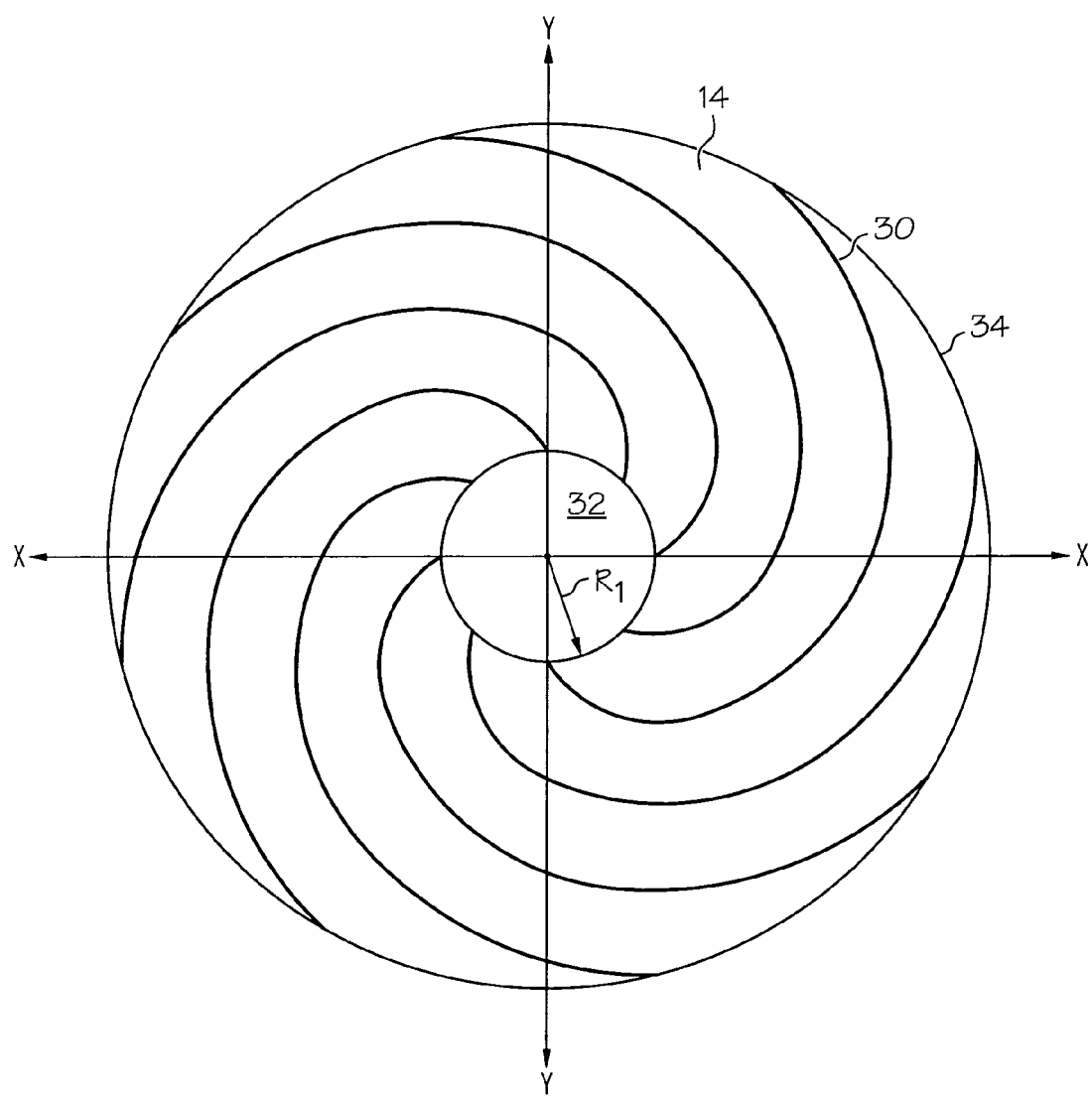
FIG. 2 illustrates the x and y cutting directions for the polishing pad of FIG. 1.

Referring to FIG. 2, polishing pad 14 includes curved spiral grooves 30 that originate from radius R1 spaced from center 32. The grooves 30 curve in a counterclockwise direction until they reach outer periphery 34. These grooves may have any curved shaped, such as a spiral, curved-radial, sinusoidal oscillating shape, multi-curved shape, multi-curved shape including linear segments or broken curved shapes. Cutting curves into a polishing pads requires the programming of complex instructions into the tool. These instructions, determine the rotating cutting bit's direction in the x and y directions, illustrated by lines x—x and y—y, respectively. The cutting bit's average speed equals the following:

$$\text{Avg. Speed} = (vx^2 + vy^2)^{1/2}$$

where vx and vy equal the velocity in the x and y directions respectively.

When cutting curved grooves, the velocity in the x and y directions constantly changes, but the average speed remains as close to constant as possible. If the tool arm slows or stops with each change of direction, then the resulting groove can fail to obtain a smooth finish and even result in melting of the polishing pad's sidewall. Maintaining the average speed to as close a constant speed during complex curved grooving operations facilitates the manufacturing of smooth grooves and reduces the risk of melting the polishing pad's sidewalls. This failure to slow or stop with changing groove directions can enter some additional error in the grooves' location, but the benefits achieved by maintaining average speed more than offset any error in groove location.

Figure 3:
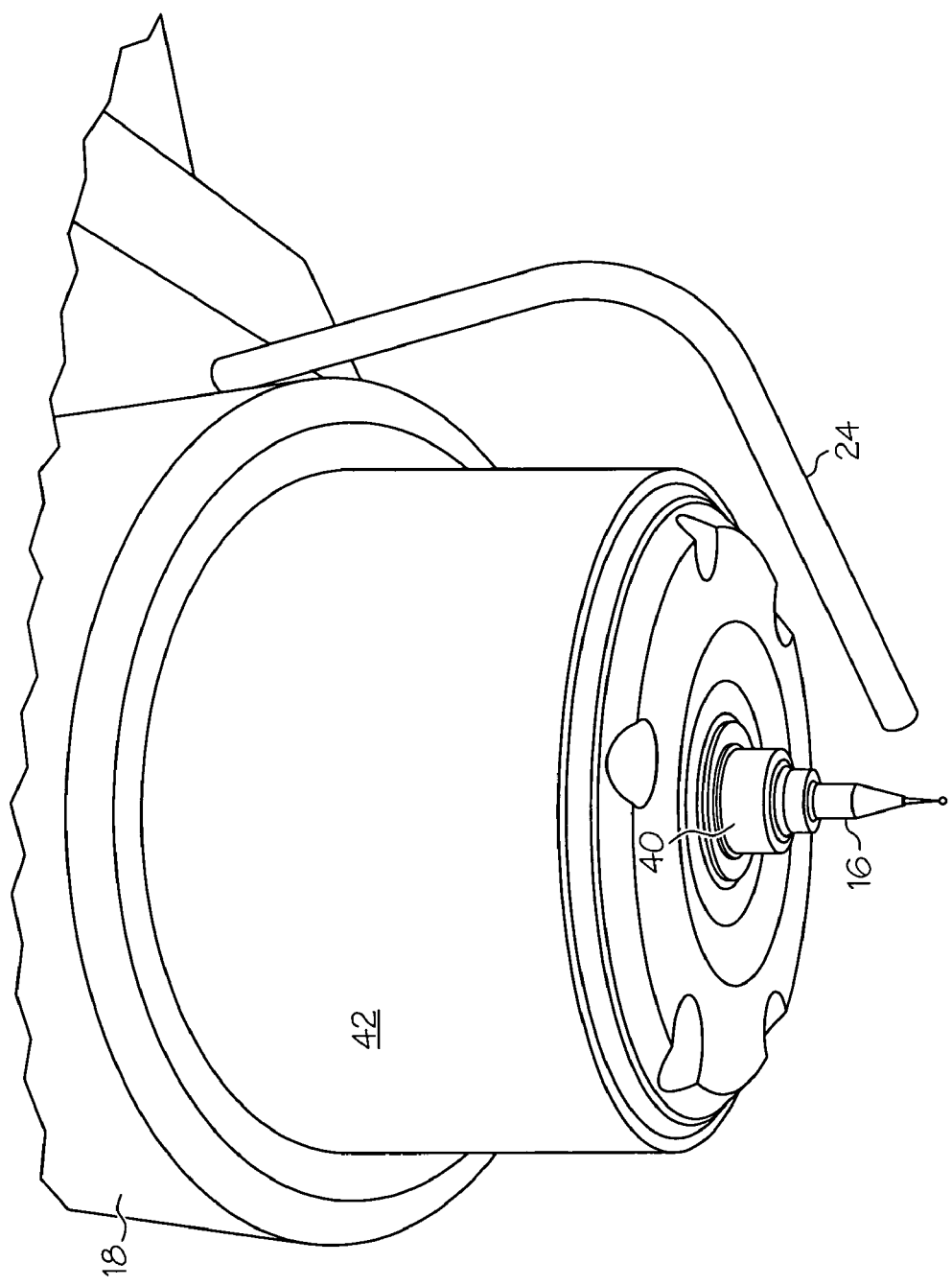
FIG. 3 provides an expanded view of the spindle and cutting bit of FIG. 1.

The expanded spindle view of FIG. 3 illustrates the cutting bit 16 cooled with gas flow through directional gas line 24. The gas from line 24 flows toward rotating cutting bit 16 and the polishing pad 14 (FIG. 1 and FIG. 2). A collet 40 secures the rotating bit at high speeds. Shield 42 connected to vacuum line 22 assists in removing debris from the polishing pads' grooves.

Figure 4A:
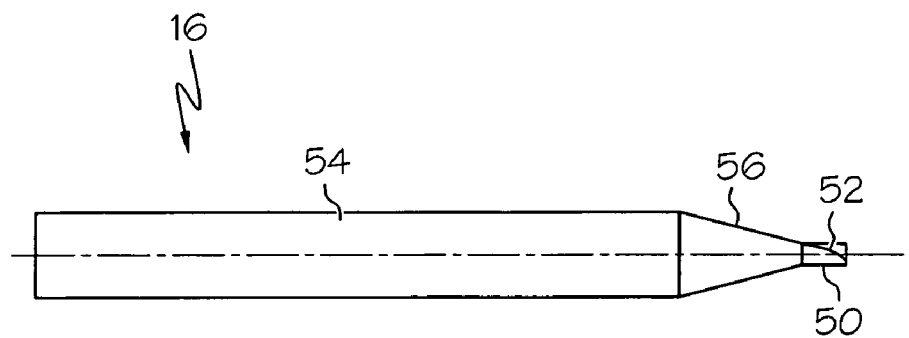
FIG. 4A provides an expanded view of the cutting bit of FIG. 3.
Figure 4B:
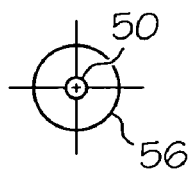
FIG. 4B represents an end view FIG. 4A.
Figure 4C:
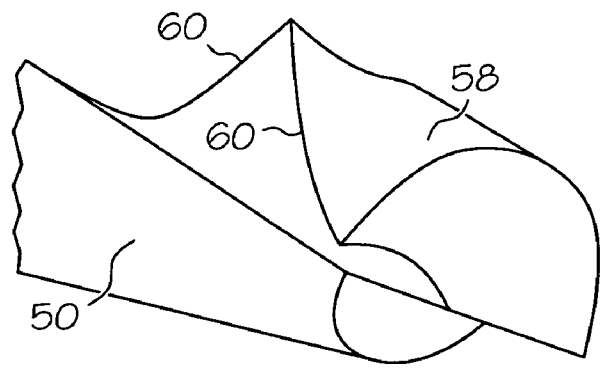
FIG. 4C is an expanded view of the single fluted cutting bit of FIG. 4A.

An exemplary end mill cutting bit 16 is shown in FIGS. 4a to 4c. The cutting bit 16 includes a cutting end 50 suitable for side-cutting. Designs suitable for side cutting include burr bits, router bits or end mill bits. The cutting end 50 includes a single flute 52 for facilitating removal of debris, but may optionally have more than one. The flute 52 has a length, which determines the maximum insertion depth or the maximum depth of cut. Preferably, the flute or flutes have a volume greater than forty percent of volume formed by rotating cutting end of the rotating cutting bit about its axis. Increased flute volume, such as flute volumes above fifty percent facilitate debris removal, but can decrease tool strength. Single bit designs preferably have a corkscrew shape with less than two turns in the cutting end.

The cutting bit 16 has a shank 54 that is received by the collet 40 (FIG. 3), and a tapered region 56 connects the shank 54 to the cutting end 50. The shank 54 has a width that corresponds to the opening diameter the collet. The cutting end 50 also has a cutting width, defined by the lateral displacement of the cutting end 50 as the bit 16 rotates. The cutting width may be constant or may vary as some function of position along the axis of length of the cutting end 50. The flute 52 has a helix angle, measured from a plane through the axis of length to the tangent line of the flute, which may remain constant or may vary as a function of position along the axis of length of cutting blade 58. The radially-outward most or cutting edge 60 of the flute either carries or is shaped to form a cutting blade 58. The blade 58 forms the cutting edge 60 defined by a wedge angle and a clearance angle. The wedge angle is the angle formed by the intersection of the planes of each face of the blade 58 that forms the cutting edge 60. The clearance angle is the angle formed by the tangent line of the cutting blade path and the rear face of the cutting blade 58.

The grooving tool forms grooves in the polishing pad by rotating the spindle, thereby rotating the cutting bit, and contacting the cutting edge of the rotating cutting bit with the polishing pad to remove polishing pad material. The cutting bit can be moved relative to the polishing pad by moving the table, moving the arm, or both, to remove material creating the desired groove shape and dimensions. Optionally, the cutting arm may be tilted so that the axis of rotation of the cutting bit is not perpendicular to the surface of the polishing pad.

A groove formed this way will have a width, which may vary along the depth, such as v-shaped or dove-tail shaped, or may be constant (parallel sidewalls). The width of the groove is determined by the cutting width of the cutting bit and the amount of elastic spring back of the polishing pad. The groove will also have a depth, which may vary or remain constant, which is measured from the surface opening of the groove to the average position of the bottom of the groove. A groove formed by a cutting bit that is rotated in an axis not perpendicular to the polishing pad surface will have a sloped bottom, and the depth is the average depth over the bottom surface. The direction of the groove depth is defined as the centerline between the sidewalls, and, for a groove with any length, will be a plane.

In any manufacturing process, increasing the rate of throughput, or the quantity of marketable product made in a given time period in a given process, is crucial in improving the efficiency of the process. Due to some inherent limitations associated with the use of a CNC machining process in the formation of grooves in a polishing pad, such as being limited to forming only one groove at a time, an effective way to increase the efficiency of the grooving process is to increase the rate at which the grooves are formed. The rate at which grooves can be formed is measured by the feed rate, which is the rate at which the cutting bit moves laterally relative to the surface of the polishing pad.

Simply increasing the feed rate of a CNC machine, however, leaving all other variables constant, results in decreased cutting quality and defects in the grooved polishing pad, such as a serrated edge. Common defects associated with elevated feed rates include incomplete groove formation, incomplete removal of polishing pad material, burring and tearing. The occurrence of these cutting-related defects results in the formation of grooves that have irregular width, depth or both or other characteristics such as jagged sidewalls, bottom or opening. Polishing pads with these or similar cutting-related defects are unsuitable for use in a CMP process and must be discarded. This is because the defects can interfere with the polishing process and planarization. Thus, the rate of the occurrence of defects (defectivity) significantly reduces the throughput for the manufacturing process of a grooved polishing pad.

Testing has shown that increasing the rate of rotation of the cutting bit, otherwise known as the spindle speed, helps maintain high groove quality and low defectivity when forming grooves at an elevated feed rate. It is believed that this is due to the fact that, for a given feed rate, a higher spindle speed translates to more cuts per time interval, each cut being required to remove less material. It is believed that the cutting bit performs better, resulting in smoother, more uniform grooves, with fewer defects, when required to remove less material per cut. Preferably, the spindle speed is at least 60,000 RPM, allowing for higher than typical feed rates while maintaining or improving groove quality and low defectivity. More preferably, the spindle speed is at least 120,000 RPM, and most preferably is at least 240,000 RPM allowing for greatly elevated feed rates while maintaining or improving groove quality and low defectivity.

In order to achieve spindle speeds in excess of 60,000 RPM, consideration must be paid to the design of the CNC machine, in particular to the spindle drive and to the spindle lubrication. First, the spindle drive must be capable of turning the spindle at the desired spindle speed. Many spindle drive types are capable of achieving spindle speeds in excess of 60,000 RPM, such as the use of an air turbine or electric motor. In forming grooves in a polishing pad with a CNC machine, it is preferable to maintain a constant spindle speed. Certain spindle drive types offer beneficial characteristics for maintaining a constant spindle speed under load, such as an electric motor. Depending on design, an electric motor can drive a CNC machine spindle at constant speeds of 250,000 RPM or above.

Friction plays a critical role in the operation of the CNC machine at elevated spindle speeds. If the spindle is inadequately lubricated, the drag on the spindle will prevent the spindle drive from reaching the desired spindle speed, or will make reaching this speed inefficient. In addition, the drag will cause the production of heat that can cause the spindle to wear excessively or even cease. Typical spindle lubrication systems used in CNC machining use oil-lubricated ball bearings, made of steel or ceramic, to decrease friction between the housing and the spindle by reducing the contact area and adding lubricant. At spindle speeds above 60,000 RPM, ball bearing spindles exhibit significant wear of the mechanical parts and require substantial maintenance, which decreases productivity. Alternatively, fluid bearing systems may be employed, such as air bearing spindles available from Air Bearings Ltd. Fluid bearing systems, reduce or eliminate mechanical contact between the spindle and the housing, decreasing friction by replacing a rolling element with a cushion of fluid. Air bearing systems work by forcing air into the housing, preferably at multiple locations, to create a flow of air in the very small gap (e.g. 0.0001 in or 2.5 μm) between the spindle and the housing. The flow of air creates increased pressure where the gap is smaller and lower pressure where the gap is larger. The pressure differential tends to center the spindle. Importantly, the flow of air must be great enough to create pressures sufficient to overcome the lateral load imparted to the spindle by the side-cutting CNC milling process, which increases as feed rate increases. The only friction involved in this type of fluid bearing system is the friction between the spindle and the air, which is relatively small due to the low viscosity of air. Any heat generated by that friction is quickly exhausted by the flow of air for low-speed spindle designs and liquid-cooled for high-speed spindle designs. Advantageously, liquid cooling the spindle bearing further reduces heat build up in the spindle and housing.

Friction also presents a problem at the cutting bit. Friction associated with CNC machining of a typical polishing pad with spindle speeds above 60,000 RPM creates a substantial amount of heat during the grooving process. An excess of heat may cause defects in the polishing pad such as gelling, burning, charring, melting or welding of the polishing pad material. Increasing the feed rate in conjunction with increasing the spindle speed helps to eliminate these heat-related defects. It has been found that a higher feed rate reduces defects caused by heat exposure by reducing the amount of time a given region of the polishing pad is exposed to the heat source (the cutting bit). This shorter period of time is insufficient to transfer enough heat to cause the heat-related defects. It is believed that a minimum feed rate, within a range, the range being a function of the spindle speed, is sufficient to reduce the occurrence of heat-related defects. The increased feed rate also helps to remove heat from the region of the polishing pad near the cutting bit by ensuring that chips, or little slivers of polishing pad material, are cut. If the feed rate is too low, the cutting bit will not cut enough material each rotation to form a chip. When chips are cut, they are ejected and carry with them a build up of heat. This mechanism is responsible for a substantial amount of heat dissipation in the cutting process, and is controlled by chip size, and ultimately feed rate.

The cutting bits average speed multiplied by the cutting bit's diameter equals the calculated chip thickness. During actual fabrication of polishing pads the actual chip thickness will vary greatly from the calculated chip thickness. But it has been found that maintaining the calculated chip thickness at a factor of 0.02 to 0.6 diameter of the rotating cutting bit facilitate reduced melting of the polymeric sidewalls of the polymeric polishing pad. Preferably, the curved grooving maintains the calculated chip thickness at a factor of 0.04 to 0.4 diameter of the rotating cutting bit; and most preferably maintains the calculated chip thickness at a factor of 0.05 to 0.5 diameter of the rotating cutting bit provides effective chip removal and reduced melting of the polishing pads' sidewalls. Preferably, maintaining the average velocity prevents or eliminates melting of the polymeric sidewall visible at 10× magnification. In addition, maintaining the cutting bit's average speed within fifty percent for each groove facilitates further improvement in groove quality. For example, increasing the average speed of the bit tends to experience more spring-back and result in narrower grooves than grooves formed with slower average speeds. Thus, varying the cutting bits average speed can result in grooves with varied widths. Preferably, the drill bit's average speed remains within 20 percent for each groove and most preferably, within 10 percent for each groove. Typical average speeds obtained are greater than 100 in/min (2.5 m/min) or 200 in/min (5.1 m/min). Preferably, the average speed is within 200 and 1,000 in/min (5.1 to 25 m/min).

Another way to decrease the occurrence of heat-related defects, which may optionally be employed in conjunction with increased feed rate, is by cooling the cutting bit, cooling a region of the polishing pad in the proximity of the cutting bit, or both. Cooling can be achieved through many techniques, for example, blowing compressed air over the cutting bit to facilitate convection, blowing chilled air over the cutting bit, spraying the bit with water or blowing cooled gases on the cutting bit.

An optional method for generating chilled air is through the use of a vortex cooler. A vortex cooler works by taking advantage of the centrifuge effect, separating out molecules according to their energy level, and, therefore, temperature. A vortex cooler is an apparatus that allows high temperature particles to migrate to one area, and concentrates low temperature particles in another area and ejects them in a controlled manner. These low temperature particles can be directed at the cutting bit, and used to cool the cutting bit, the region of the polishing pad near the cutting bit, or both.

Another method for cooling the cutting bit is blowing cooled, liquefied or cryogenic gas, such as argon, carbon dioxide or nitrogen, directly onto the cutting bit, a region of the polishing pad near the cutting bit, or both. Preferably, spraying compressed gas through a specialized nozzle or nozzles, whereby the gas rapidly expands, cools, and forms solid crystals or liquid to facilitate heat transfer. Alternatively, spraying a cryogenic liquefied gas through nozzles also facilitates heat transfer. The crystals, liquid or a solid-liquid mixture impinge upon the polishing pad and are particularly effective at cooling the cutting bit, especially from higher temperatures caused by higher spindle speeds. This cooling of the cutting bit has the added efficacy of increasing useful tool life of the cutting bit. Cooling may be used alone, or in conjunction with an elevated feed rate, to reduce the occurrence of heat-related defects.

These cooling techniques involve creating a flow of material (gas, liquid or crystals) and directing the flow to encounter the cutting bit, the region of the polishing pad near the cutting bit, or both. If the flow is directed at the polishing pad in the region near the cutting bit, the flow may have the additional effect of aiding in the removal of chips from the groove. Removing chips from the groove may be beneficial by reducing the potential for the chips to reattach to the polishing pad, i.e. by melting, fusing or welding. To the extent that removing chips from the groove reduces the number of chips that reattach to the polishing pad, defects are avoided, and throughput is increased. Optionally, it is possible to cryogenically cool the entire polishing pad and machine the cryogenically cooled pad or still further to cryogenically cool the polishing pad and the machining fixture.

Additionally, chips may adhere to the cutting bit, interfering with the formation of the grooves. If an excess of chips adhere to the cutting bit, by melting or by static, or other electrical attraction, the occurrence of cutting-related defects, or heat-related defects may increase. The flow of material, i.e. gas, produced in the cooling process may aid in the removal of chips from the cutting bit by overcoming the mechanical or electrical attractive force, and thereby reduce defectivity. This is particularly important when cutting grooves having a depth of at least twice the diameter of the rotating cutting bit.

EXAMPLES

A series of studies were carried out to improve groove quality for complex curved grooves as illustrated in Appendix 1. The groove quality was inspected visually per criteria established in Table 1.

TABLE 1

Post grooving inspection criteria: Grade A–D

| Grade | Groove dimension (width, depth)* | Groove quality (after cleaning, shape) | Result |
|---|---|---|---|
| A | Consistent groove dimension (in control), within groove spec. | Sharp groove edge/corner, no burr or debris inside of groove, easy to clean out w/ hand brush | Good |
| B | Consistent groove dimension (in control), within groove spec. | Relatively sharp/clean groove edge/corner, only few burr or debris (<1 per groove line) inside of groove, need air blast to clean out | Acceptable |
| C | Consistent groove dimension (in control), within groove spec. | Lots of burrs or debris (>3 per groove line) inside of groove, difficult to clean out | Reject on Quality |
| D | Inconsistent groove dimension (out of control), out of groove spec. | Any | Reject on Dimension |

Example 1

For harder materials like the IC1000™ polyurethane polishing pad, higher chip loading (for example, 0.0064 cm/rev.) produced better groove quality. Optimum operation was around 686 cm/min. (270 ipm) feed rate; and a 120 k rpm spindle speed produced the best groove quality on IC1000™ pads with either the PMT or KT tool bits.

Feed rate(ipm)=Chip load×Spindle speed(rpm)

Example 2

For softer materials like VisionPad™ polyurethane polishing pads, lower chip loading (for example, 0.0044 cm/rev.) produced better groove quality. Optimum operation was around 533 cm/min. (210 ipm) feed rate and a 150 k rpm spindle speed produced the best groove quality on VisionPad™ polyurethane polishing pads with PMT tool bits.

APPENDIX 1

| Study | Top Pad materials | Table Feed Rate (cm/min.) | Spindle Speed (RPM) | Chip Load (cm/rev.) | Bit Type | Groove Quality* (Grade A–D) | Comment |
|---|---|---|---|---|---|---|---|
| #1 | IC | 366 | 83 k | 0.0044 | PMT | B | Burrs at intersections, need air blast to clean out |
|  | IC | 533 | 120 k | 0.0044 | PMT | B | Burrs at intersections, need air blast to clean out |
|  | IC | 762 | 172 k | 0.0044 | PMT | B− | Lost of burrs at intersections, need air blast to clean out |
|  | IC | 366 | 83 k | 0.0044 | PMT | A |  |
|  | IC | 533 | 120 k | 0.0044 | PMT | A |  |
|  | IC | 762 | 172 k | 0.0044 | PMT | B+ | Both ends of groove lines not sharp |
|  | IC | 366 | 83 k | 0.0044 | PMT | A |  |
|  | IC | 533 | 120 k | 0.0044 | PMT | A |  |
|  | IC | 762 | 172 k | 0.0044 | PMT | B+ | Both ends of groove lines not sharp |
|  | IC | 366 | 83 k | 0.0044 | PMT | A |  |
|  | IC | 533 | 120 k | 0.0044 | PMT | A |  |
|  | IC | 762 | 172 k | 0.0044 | PMT | B+ | Groove edges not clean or sharp |

APPENDIX 1-continued

| Study | Top Pad materials | Table Feed Rate (cm/min.) | Spindle Speed (RPM) | Chip Load (cm/rev.) | Bit Type | Groove Quality* (Grade A–D) | Comment |
|---|---|---|---|---|---|---|---|
| #2 | IC | 533 | 120 k | 0.0044 | PMT | A | |
| | IC | 533 | 120 k | 0.0044 | PMT | C | Lots of burrs at intersections, diff to clean out even w/ air blast |
| | IC | 533 | 120 k | 0.0044 | PMT | A | |
| | IC | 533 | 120 k | 0.0044 | PMT | A | |
| | IC | 533 | 120 k | 0.0044 | PMT | A | |
| | IC | 533 | 120 k | 0.0044 | PMT | A | |
| #3 | IC w/ high SG | 533 | 120 k | 0.0044 | PMT | A | |
| | IC w/ target SG | 533 | 120 k | 0.0044 | PMT | A | |
| | IC w/ low SG | 533 | 120 k | 0.0044 | PMT | A | |
| | VP3100 w/ high SG | 533 | 120 k | 0.0044 | PMT | B– | Groove lines not sharp throughout |
| | VP3100 w/ target SG | 533 | 120 k | 0.0044 | PMT | B | Both ends of groove lines not sharp |
| | VP3100 w/ low SG | 533 | 120 k | 0.0044 | PMT | B | Both ends of groove lines not sharp |
| | P-51 | 533 | 120 k | 0.0044 | PMT | B– | Groove lines not sharp throughout |
| | T-52 | 533 | 120 k | 0.0044 | PMT | A | |
| #4 | IC | 533 | 120 k | 0.0044 | KT | B– | Slight improvement over PMT |
| | VP3100 | 533 | 120 k | 0.0044 | KT | C | No good for VP |
| | IC | 686 | 120 k | 0.0057 | KT | A– | Improve over PMT |
| | IC | 686 | 120 k | 0.0057 | KT | B– | About same quality as 533/120 k but improved on process time |
| | VP3100 | 533 | 180 k | 0.0030 | KT | C | Doesn't improve on lower chip load like PMT bit |
| #5-A | IC | 610 | 120 k | 0.0051 | PMT | B+ | |
| | IC | 686 | 120 k | 0.0057 | PMT | B+ | |
| | VP3100 | 610 | 120 k | 0.0051 | PMT | B+ | |
| | VP3100 | 686 | 120 k | 0.0057 | PMT | B | |
| | IC | 610 | 120 k | 0.0051 | PMT | B– | |
| | IC | 686 | 120 k | 0.0057 | PMT | B– | |
| #5-B | IC | 533 | 150 k | 0.0044 | PMT | B | |
| | IC | 762 | 200 k | 0.0038 | PMT | B | |
| | VP3100 (Max) | 533 | 150 k | 0.0036 | PMT | A– | |
| | VP3100 (Max) | 762 | 200 k | 0.0038 | PMT | A– | |
| | IC | 533 | 150 k | 0.0036 | PMT | C | |
| | IC | 762 | 200 k | 0.0038 | PMT | C | |
| #5-C | IC | 762 | 120 k | 0.0064 | KT | B– | |
| | IC | 686 | 120 k | 0.0057 | KT | B– | Change bit between sub 1 and 2 |
| | VP3100 (ACT) | 533 | 180 k | 0.0030 | PMT | A– | |
| | VP3100 (Max) | 533 | 180 k | 0.0030 | PMT | A– | |
| | VP3100 | 533 | 150 k | 0.0036 | PMT | B | |
| | VP3100 | 533 | 180 k | 0.0030 | PMT | C | |
| | VP3100 | 533 | 150 k | 0.0036 | PMT | B– | |
| | P51 | 533 | 150 k | 0.0036 | PMT | C | |
| | P51 | 533 | 180 k | 0.0030 | PMT | C | |

Note: All tested with one pad per bit, unless marked otherwise; KT = KYOCERA TYCOM Material: Mitsubishi carbide, grade MF10 single flute; and PMT = Performance Micro Tool, Material: Micrograin carbide, single flute.

The invention claimed is:

1. A method for forming grooves in a polymeric polishing pad useful for the chemical mechanical planarization of a substrate, the substrate being at least one of magnetic, optical and semiconductor substrates comprising:
   rotating a cutting bit about an axis in a z-direction, the cutting bit rotating at a rate of at least 60,000 revolutions per minute, the rate being sufficient to melt the polymeric polishing pad upon low velocity contact with the polishing pad without cooling and having at least one cutting edge for cutting groove depth in the z-direction into the polymeric polishing pad;
   cutting the polishing pad in an x-direction and a y-direction to form at least one curved groove in the polymeric polishing pad, the x-direction and y-direction being perpendicular in a single plane and orthogonal to the z-direction, said cutting occurring by contacting the rotating cutting bit with a portion of the polymeric polishing pad, the at least one curved groove having polymeric sidewalls;
   ejecting cut debris from the polishing pad within the at least one groove with at least one flute in the rotating cutting bit; and
   varying velocity of the cutting in at least one of the x-direction or y-direction with a program-generated signal to guide the cutting through a curved path and to provide the at least one groove with a curved configuration in the polymeric polishing pad, the program-generated signal sending the cutting on a curved path while maintaining the velocity of the rotating bit to maintain a calculated chip thickness at a factor of 0.02 to 0.6 of a diameter of the rotating cutting bit and to reduce melting of the polymeric sidewalls of the polymeric polishing pad.

2. The method of claim 1 wherein the ejecting includes the at least one flute being a single flute and the single flute has a volume greater than forty percent of volume formed by rotating a cutting end of the rotating cutting bit about its axis.

3. The method of claim 1 comprising the additional step of cooling at least one of the rotating cutting bit and a region of the polishing pad proximate the cutting bit.

4. The method of claim 3 wherein the step of cooling comprises providing compressed gas, flowing the compressed gas through at least one small aperture nozzle and allowing the gas to expand.

5. The method of claim 1 wherein the rotating cutting bit rate maintains the calculated chip thickness at a factor of 0.04 to 0.4 of the diameter of the rotating cutting bit.

6. The method of claim 1 wherein the cutting forms a groove having a depth of at least twice a diameter of the rotating cutting bit.

7. The method of claim 1 wherein the rotating cutting bit has a corkscrew shape with less than two complete turns in its cutting end.

8. The method of claim 1 wherein the rotating is performed by a rotating spindle attached to the rotating cutting bit supported with an air bearing.

9. The method of claim 1 wherein the polymeric polishing pad is a non-porous polyurethane polishing pad.

10. The method of claim 1 wherein the polymeric polishing pad is a porous polyurethane polishing pad.

* * * * *